Figure 17:
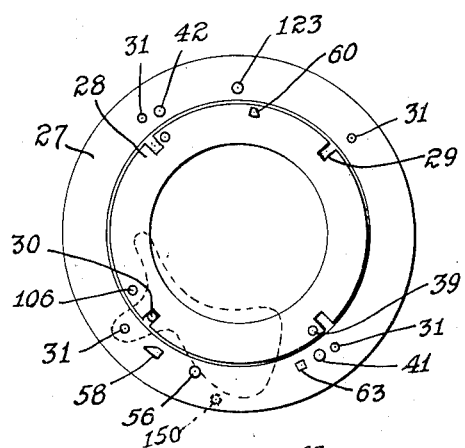

May 9, 1944.    T. McG. AIKEN    2,348,510
CAMERA
Filed March 21, 1941    4 Sheets-Sheet 1
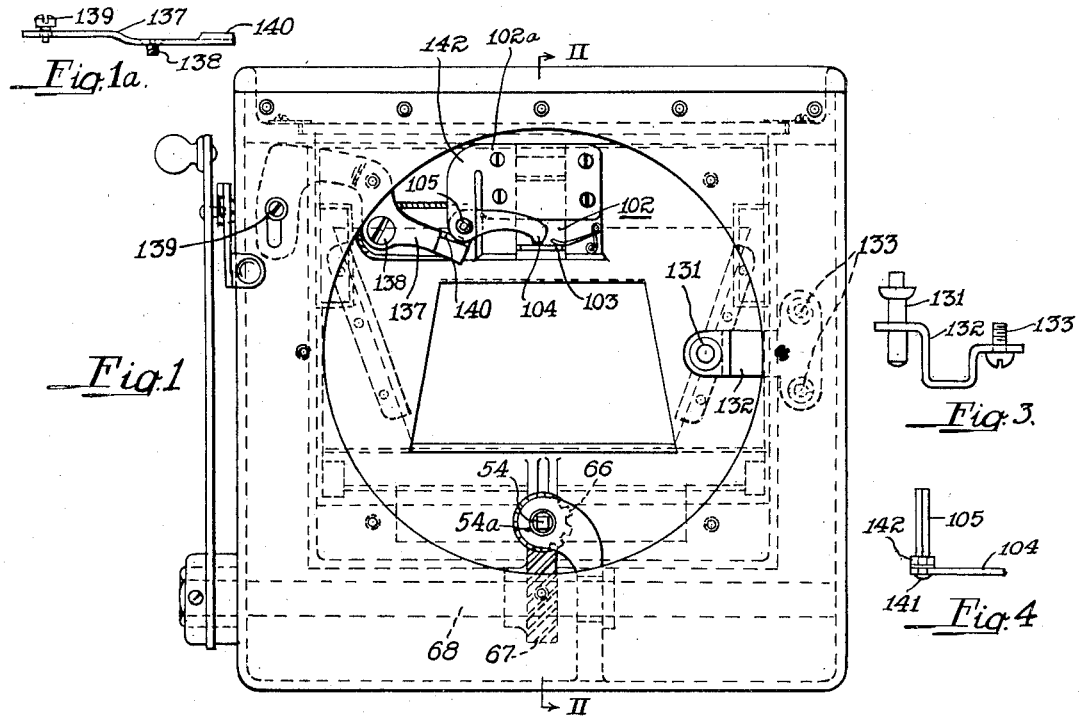
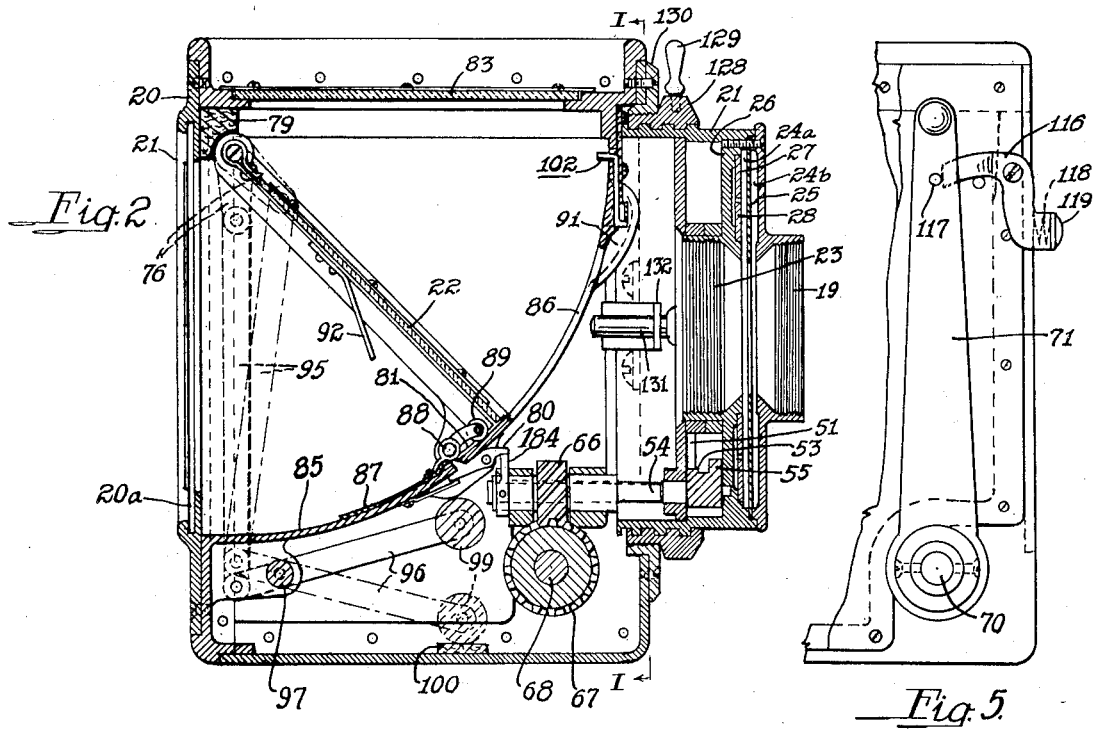
INVENTOR.
Thomas McG. Aiken
Archworth Martin
His Attorney
BY May 9, 1944. T. McG. AIKEN 2,348,510
CAMERA
Filed March 21, 1941 4 Sheets-Sheet 2
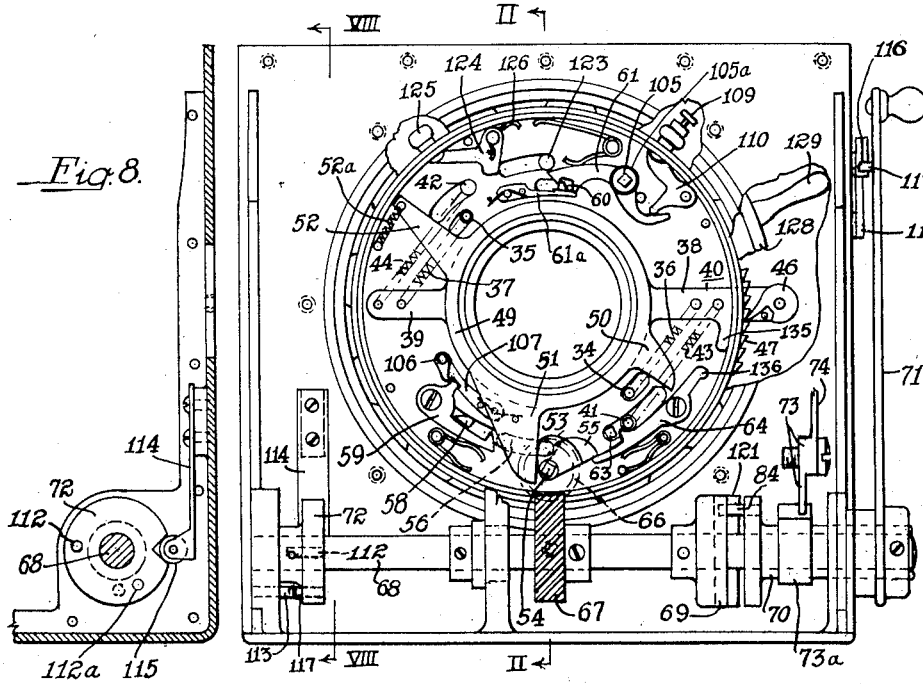
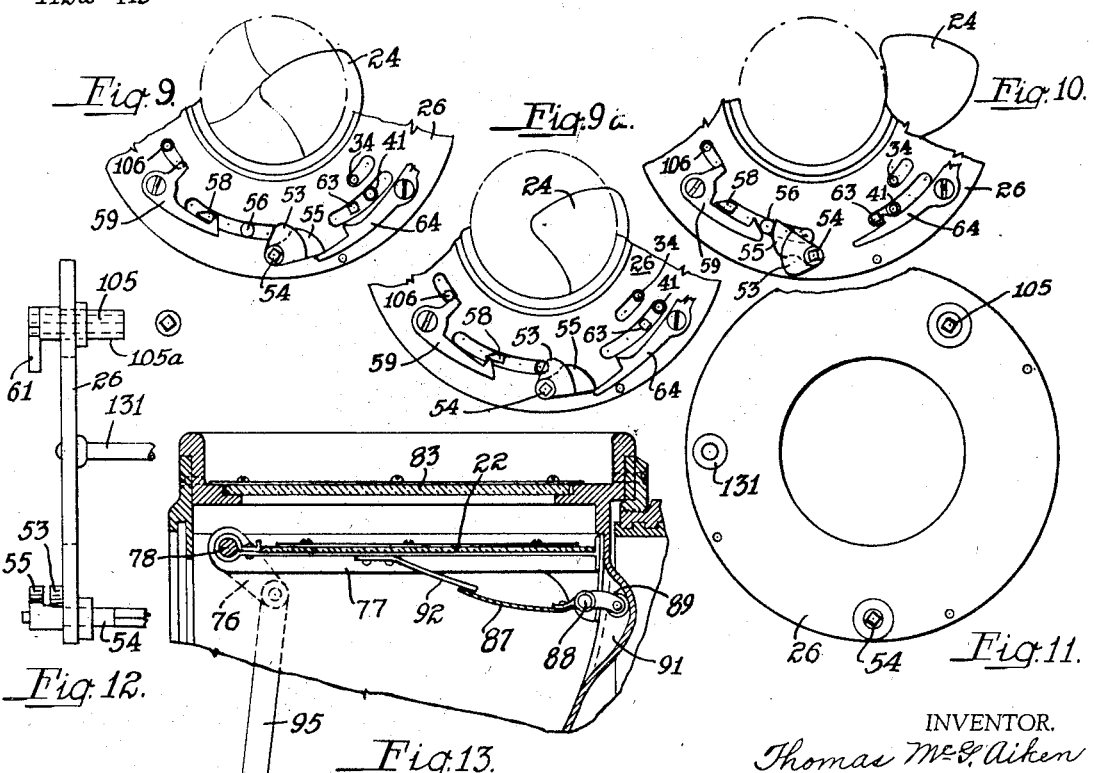
INVENTOR.
Thomas McG. Aiken
BY Archworth Martin
His Attorney May 9, 1944.  T. McG. AIKEN  2,348,510
CAMERA
Filed March 21, 1941    4 Sheets-Sheet 3
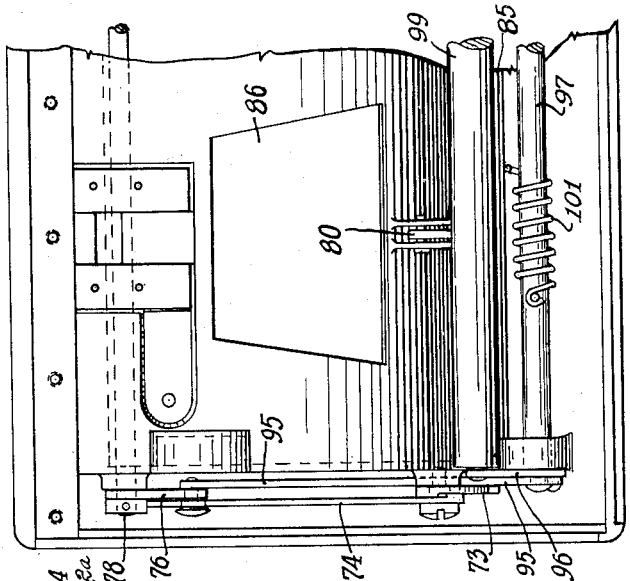
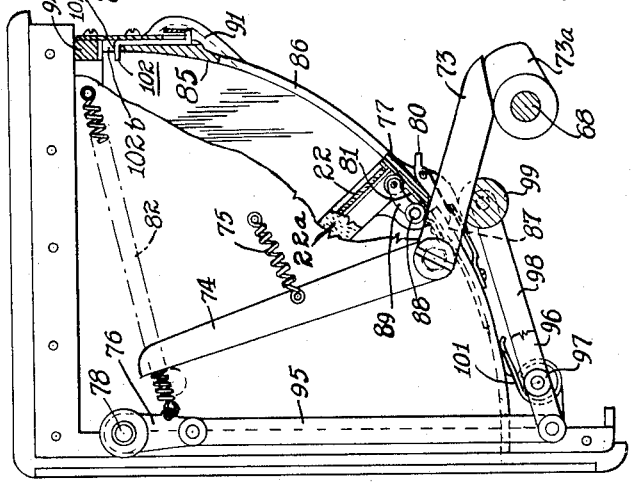
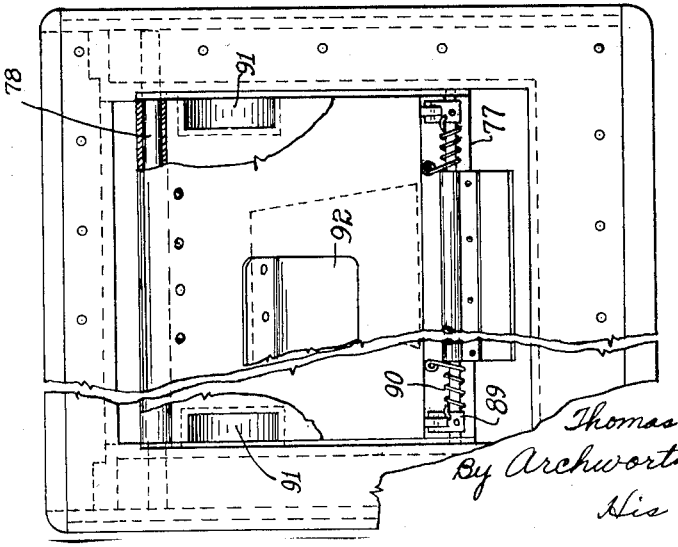
INVENTOR.
Thomas McG. Aiken
By Archworth Martin
His Attorney Patented May 9, 1944

2,348,510

UNITED STATES PATENT OFFICE 2,348,510

CAMERA

Thomas McG. Aiken, Pittsburgh, Pa.

Application March 21, 1941, Serial No. 384,435

12 Claims. (Cl. 95—42)

My invention relates to cameras and more particularly to those of the reflex type wherein the lens and the shutter are located forwardly of the mirror, as distinguished from cameras of the focal plane shutter type.

In the present application, I show a modification of my Patent No. 2,168,893, altered to make a camera of the reflex type, certain of the operating parts being also modified.

When employing reflex cameras in photographing moving objects, in many instances there is too great delay between the time for focusing and the start of the exposure for the picture, owing to the lapse of time between movement of the mirror from focusing position to the operation of the shutter, so that the object will have moved some distance during the period between the focusing and the exposure operations.

In the case of focal plane shutters, where the curtain slit or opening moves across the field of the sensitized surface, from one edge to the other, there is a distortion of the true position of a moving object. Also, in the use of flash lights with focal plane shutters, the exposure may not occur during the illumination peak. Another objection to some cameras of the reflex type is that because the mirror frequently has to be moved very quickly away from focusing position, it imparts an impact to the camera at the end of its movement, thus shifting the position of the camera, or setting up vibrations thereof.

One object of my invention is to provide a camera of the reflex type wherein the focusing mirror is positioned between the lens and the light-sensitized element, and is provided with means whereby danger of light rays from above or in front of the mirror passing to the sensitized surface during movements of the mirror is avoided.

Another object of my invention is to provide a camera of the reflex type wherein the movement of the mirror from focusing position is followed more quickly by the operation of the shutter than is possible with reflex cameras of other forms.

Still another object of my invention is to provide means for counteracting the force or impact exerted by a focusing mirror when it is moved from its focusing position.

A further object of my invention is to provide operating mechanism whereby the focusing mirror and the shutter mechanism can be operated quickly, conveniently and efficiently.

Another object of my invention is to provide a reflex camera of such form that exposure throughout the area of an entire plate or film can be made through one lens, at any given instant.

Another object is to provide means whereby a reflected image on the screen, of the view to be photographed, can be had exactly as it will appear on the film.

And another object is to provide a structure wherein the shutter and focusing elements can be set in focusing position and in condition to take a picture, by a single setting operation of one member.

Figure 18:
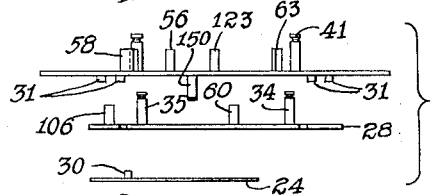
Figure 19:
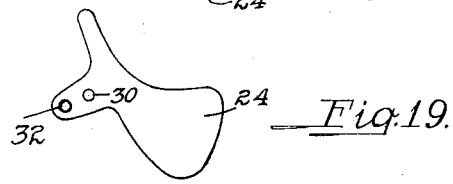
Figure 20:
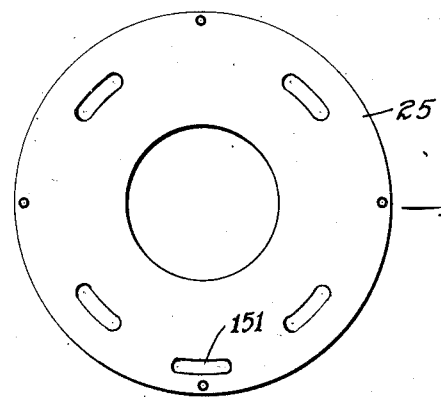

As shown in the accompanying drawings, Figure 1 is a vertical view of the front portion of the camera, on the line I—I of Fig. 2; Fig. 1a is a plan view of one of the elements of Fig. 2; Fig. 2 is a longitudinal sectional view through the camera, on the line II—II of Fig. 1; Fig. 3 is a plan view of a portion of the apparatus of Fig. 1, showing a retaining bracket for holding certain of the parts against movement during focusing adjustments; Fig. 4 is a plan view of a portion of one of the operating elements of Fig. 1; Fig. 5 is a fragmentary side elevational view of a portion of the structure of Fig. 1; Fig. 6 is a view showing the shutter operating mechanism, looking from the rear, with the rear cover of the shutter omitted; Fig. 7 is a sectional plan view of the spring tension adjusting device and the shutter-setting ring of Fig. 6; Fig. 8 is a view taken on the line VIII—VIII of Fig. 6; Fig. 9 is a fragmentary view showing the position occupied by certain of the shutter-moving elements of Fig. 6 at one stage of operation; Figs. 9a and 10 show the positions thereof at other stages; Fig. 11 is a rear face view of the rear cover plate for the shutter mechanism of Fig. 6; Fig. 12 is an edge view thereof showing certain of the operating elements supported therein; Fig. 13 is a vertical sectional view through the focusing mirror and a portion of the operating mechanism thereof; Fig. 14 is a view looking into the rear of the camera behind the mirror, a portion of the mirror being broken away; Fig. 15 is a side view partially in section, showing the focusing mirror and the operating mechanism therefor; Fig. 16 is a front view of the apparatus of Fig. 15; Fig. 17 is a rear view of the shutter-operating rings in relatively assembled relation; Fig. 18 is a view showing the shutter rings of Fig. 17 and one of the shutter blades in disassembled relation; Fig. 19 is a face view of one of the shutter blades, and Fig. 20 shows the front cover plate for the parts of Fig. 17, and serves as a retaining element for holding the shutter blades in place.

The camera comprises the usual box 20 having a holder or guide at its rear side that has slots 20a for a film or plate holder; a focusing mirror 22 which is pivotally mounted in the mirror chamber, and a shutter assembly comprising a case 21 having lens-supporting portions 19 and 23 and shutter blades 24 (Figs. 9 and 17) operating in the space 24a (Fig. 2), between the members 19 and 23. Four shutter blades 24 are positioned between a plate 25 and a rear partition plate 26. The shutter blades 24 and the operating rings 27 and 28 therefor are positioned between the plates 25 and 26. These rings are shown in Figs. 17 and 18. The ring 28 lies within the ring 27 and has four slots 29 for the reception of studs 30 on the four blades 24, when the rings and blades are assembled as in Fig. 17, the studs 31 on the ring 27 extending through holes 32 in the blades and into the slots in the plate 25, so that as the rings 27 and 28 are oscillated relative to one another, the blades 24 will be oscillated to and from their closed position, as disclosed in my Patent 2,168,893. Space 24b is provided for a diaphragm of suitable form (not shown).

A stud 150 is provided on the ring 27 and will extend through a slot 151 in plate 25 (Fig. 20) to automatically reduce a diaphragm from focusing aperture to exposure aperture, in connection with apparatus disclosed in my copending application Ser. No. 384,484, filed Mar. 21, 1941.

The ring 28 has a pair of posts 34 and 35 to which springs 36 and 37 are respectively connected, at one end, the other ends of the springs being connected to oppositely-disposed arms 38 and 39 of a tension-adjusting collar 40. The ring 27 has posts 41 and 42 to which springs one end of springs 43 and 44 are respectively connected, the other ends of the springs being connected to the arms 38 and 39. The collar 40 is adjustable about its center and is held in adjusted position, against the tension of the springs, by a pivoted pawl 46 carried thereby in position to engage a rack 47 on the shutter frame. When the rings 27 and 28 are moved clockwise (as viewed in Fig. 6), the springs 36, 37, 43 and 44 will be placed under tension, to return the rings to their original positions when they are released, the shutter blades 24 then being closed.

In order to shift the rings 27 and 28 and place them under spring tension, a setting ring 49 is provided, which has arms 50, 51 and 52, the arm 52 being connected to the shutter casing by a spring 52a which will return it to the position shown in Fig. 6. When the ring 49 is turned clockwise from the position shown in Fig. 6, its arm 50 will engage the posts 34 and 41, thus moving the rings 27 and 28 and tensioning the springs 36, 37, 43 and 44. The ring 49 is moved in this clockwise direction by the counter-clockwise rotation of a cam member 53 that is mounted on a shaft 54 that extends through a bushing 54a (Fig. 1) that carries a gear wheel 66 and a cam 84. A second cam member 55 on the shaft 54 engages a stud 56 that is carried by the ring 27, when the cam member 53 has completed its movement of the ring 49. The cam 55 thus moves the ring 27 a slight distance further, independently of the ring 28.

Movement of the ring 49 by the cam 53 will move a latch pin 58 which is on the ring 27, past the free end of a spring-pressed latch 59 that is pivotally mounted in the casing, and causes a latch pin 60 on the ring 27 to be moved beneath a spring-pressed latch 61. The latches 59 and 61 will, at this time, hold the shutter rings 27 and 28 against the pull of the springs 36, 37, 43 and 44. Since the rings 27 and 28 have been advanced simultaneously and there has consequently been no relative shifting of the pivot points at 30 and 31 of each blade, the shutter blades still remain in their closed position. However, further rotation of the shaft 54 in a counter-clockwise direction as viewed in Fig. 6, brings the cam 55 against the stud 56 on the ring 27, thus moving the ring further, until a stud 63 thereon is engaged by a spring-pressed latch 64. This additional movement shifts the pivot studs 31 farther along relative to the studs 30, so that the shutter blades are swung to open position where they will be held by the latch 64, until it is tripped by return movement of the cam 55 past neutral position, as hereinafter explained.

The cam shaft 54 carries a spline gear wheel 66 that is driven by a gear wheel 67. The gear wheel 67 is carried on a shaft 68 that is journaled in the camera box and has a driven clutch element 69 on one end thereof, that cooperates with a driving clutch element 84 on a shaft 70 that has an operating handle 71.

When the handle 71 is swung rearwardly, the shaft 54 will be rocked to rotate the cam elements 53 and 55 to place the shutter rings 27 and 28 under tension and cause the shutter blades to be latched in open position, as above explained. This movement of the handle 71 moves a cam 73a which is on the shaft 68 against one arm 73 of a bell crank, to move it in a counter-clockwise direction as viewed in Fig. 15, so that the arm 74 of the crank will be moved against the tension of a spring 75 that is secured to the arm and the wall of the mirror chamber. The upper end of the arm 74 is thereby caused to push a crank arm 76 from the forwardly dotted position of Fig. 2 to that of Fig. 15, whereby the mirror is swung from its upper (horizontal) position (Fig. 13) to the focusing position (Figs. 2 and 15). The crank arm 76 and the mirror frame 77 which carries the mirror 22 are rigidly secured to a shaft 78 that is journaled in the mirror chamber wall. A pad 79 prevents light rays passing down behind the pivoted end of the mirror frame. The mirror frame 77 is held in its lower position by a latch 80 whose lower end is spring-pressed into latched engagement with a notch in the mirror flange 81 of the mirror frame. When the latch is released, the mirror will be swung to its upper position by a spring 82 which is placed under tension through movement of the mirror to its focusing position, the spring being connected to the crank 76 and an upper portion of the mirror chamber wall.

The rearward movement of the handle 71, to set the parts as above explained, is limited by a stop pin 112 that is carried by a disc 72 and which engages a stop pin 113 carried by the inner wall of the camera (Fig. 6). A stop pin 112a on the disc 72 engages the pin 113 to limit forward movement of the handle 71. The handle 71 will then be returned to its neutral position, as shown in Figs. 5 and 6, at which point it will be held by a yieldable latch 114 that is secured to the wall of the casing and has a roller 115 engaging a notch in the disc 72 (Figs. 6 and 8). Accidental movement of the handle is thereby prevented. A stop member 116 is provided on the side of the casing, to prevent further forward movement of the handle 71 at this time. This stop member is pivoted to the side of the casing (Fig. 5) and has its rear end yieldably held in position to engage a stud 117 on the handle, by a spring 118 interposed between the side of the casing and a button-like portion 119 on the front end of the member 116. When 119 is depressed, the latch member 116 will be rocked to clear the stud 117 and permit further forward movement of the handle 71.

When the shutter has been set at open position as in Fig. 10, and the mirror at focusing position as above explained, and with the handle 71 returned to neutral position (Figs. 5 and 6), the parts will be as in Fig. 6. The operator can view the reflected image on the focusing screen or glass 83, in order to properly focus and position the camera, a suitable hood being provided on the top of the camera. Thereupon he will move the handle 71 forwardly, causing the cam 55 to trip the latch 64, thus allowing the ring 27 to be pulled counter-clockwise (Fig. 9) until its stud 58 engages and is held by the latch 59. The shutter blades 24 are thereby closed. A latch 107 (Fig. 6) which has a rectangular recess that engages the tail of the latch 59 prevents the latch 59 from being accidentally thrown to release position through impact of the stud 58 (Fig. 9). Simultaneously with this tripping movement by the cam 55, a cam 184 on the shaft 54 (Fig. 2) will engage the tail of the latch 80, releasing the mirror for upward movement under the pull of the spring 82. During this upward movement the mirror frame moves along the curved wall 85 of the mirror chamber. The edges of the mirror frame may suitably be faced with plush 22a or the like (Fig. 15) that engages the wall 85 and the sides of the mirror chamber, to shut off light. The wall 85 has a central opening 86 through which focusing and exposure take place. A sealing plate or flap 87 is hinged to the skirt 81 of the mirror frame, by a shaft or pintle 88 which has crank arms 89 that carry rollers that roll along the curved wall 85. This plate 87 is faced with plush or other suitable material on its forward side. Each of two torsion springs 90 has one end connected to the box and is coiled around the shaft 88, the other end bearing against one of the arms 89 (Fig. 14), so as to bias the shaft in a clockwise direction (as viewed in Fig. 15). The rollers normally hold the plate 87 against the wall 85, and when passing the opening 86, the flap 87 will prevent light rays from passing the lower edge of the mirror and through the opening 86 to the film holder 21. The lower edge of the flap 87 will not have passed the lower edge of the opening 86 until after the mirror has passed the upper edge of the opening.

In order to fold the flap 87 up, clear of the opening 86, as shown in Fig. 13, when ready to make an exposure, the wall 85, near its vertical edges, has depressions 91 into which the rollers will move as the mirror approaches its upper position, so that the springs 90 can swing the shaft 88 and its arms 89 in a clockwise direction (Fig. 13) to fold the flap toward the underside of the mirror. A leaf spring 92 on the mirror frame serves to cushion this folding movement.

The mirror frame at the end of its upward swing will abut against a cushioning strip 94 of felt or other material, but there will nevertheless be an undesirable shock on the camera structure which may sometimes result in slight displacement of the camera, or of certain of the operating mechanism. To counteract this shock, I provide for exerting a force in the opposite direction at the instant the mirror frame reaches its upper limit of movement. To this end, I connect a link 95 to the crank arm 76. At its lower end the link has connection with an arm 96 that is secured to one end of a shaft 97, an arm 98 being secured to the other end of this shaft. A bar 99 serves as a counter-weight and is movable downwardly against a cushioning pad 100 on the bottom of the casing. It will be seen that when the latch 80 releases the mirror frame and the frame moves upwardly under the influence of the spring 82, the link 95 will be raised, causing the arms 96 and 98 to be swung in a clockwise direction. At the time the mirror frame reaches its upper limit of movement, the weight 99 will strike the pad 100, so that the upward impact of the mirror is counteracted by the downwardly-directed impacting force of the weight 99. A spring 101 is secured at one end to the shaft 97 and at its other end bears against the underside of the chamber wall 85 so as to bias the shaft in a clockwise direction. By varying the spring tension in any suitable manner, the impacting force of the weight 99 can be varied, by reason of its loose link connection with the mirror.

At the completion of focusing operation, with the latch 61 restraining the ring 28 against movement under the tension of its springs 36 and 37, and with the latch 59 holding the ring 27 against movement under the pull of its springs 43 and 44, movement of the mirror frame to its upper position brings it into engagement with a slide 102 that slides behind face plate 102a, whose upper bent portion extends rearwardly through a hole 102b and whose lower bent end 103 lies beneath a crank arm 104 that is secured to a shaft 105 that extends through a keyed bushing 105a ((Figs. 4, 6 and 12) which also carries the latch 61. The shaft is thereby rocked, thus tripping the latch 61 from the stud 60. The ring 28 will thereupon be swung in a counter-clockwise direction (Fig. 6), thereby shifting the pivot pins 30 relative to the pivot pins 31 and moving the shutter blades 24 to open position, for the making of an exposure. This condition exists only momentarily, because a stud 106 carried by the ring 28 will push the latch 107 out of engagement with the tail piece of the latch 59 and move into engagement with the tail piece of the latch 59 to disengage the hook of the last-named latch from the stud 58 (Fig. 9a), thereby releasing the ring 27 for movement under the pull of its springs 43 and 44, which movement shifts the studs 31 and moves the shutter blades closed. The cycle of shutter opening and closing movement which occurs following the tripping of the latch 61 is quite rapid, and may be completed within one-thirtieth of a second from the time the mirror begins its upward movement, the speed of shutter movement being dependent upon the adjustment of the arm 38 and its pawl 45 along the rack bar 47. Thus if the arm is at its uppermost position, the springs 36, 37, 43 and 44 will be placed under greater tension when setting the shutter rings 27 and 28 than when the arm 38 is at a lower position along the rack 47.

In order to avoid rebound of the ring 28 when its stud 60 reaches the end of its slot after release by the latch 61, I provide a latch 61a which, when the latch 61 is raised, will be moved up by its spring so that the tooth on 61a will move behind the stud 60 as the stud approaches its extreme left position. This avoids rebound which might cause slight opening of the shutter blades after they have closed. Downward movement of the latch 61 under pressure of its spring will thereafter depress 61a to permit the stud 60 to be returned past the beveled nose of the latch 61, to the position shown in Fig. 6.

In case it is desired to trip the latch 61 manually instead of automatically as just described, a push button or plunger 109 is depressed to rock a crank 110 and thereby rock the latch 61 to release the stud 60.

By sliding the handle 71 and its shaft 70 outwardly from the side of the box, its clutch pin 84 will be disengaged from the hole in the clutch member 69, permitting rearward movement of the handle 71 without moving the shaft 68, while forward movement of the handle 71 will bring the pin 84 into engagement with the shoulder 121 of the clutch member 69 and turn the gear wheels 67 and 66 to effect release of the latch 80. The pin 112a at this time prevents the handle being swung forwardly far enough to disengage the roller 115 from the notch. The pressure of the spring 114 will, therefore, cause return of the lever 71 to its neutral position. With the operating handle pulled out as above explained and with the shutter released to spent position, the operation of the handle 71 will serve only to set the mirror in focusing position and release it therefrom. With the parts set in this position, and with the mirror down, a pin 123 carried by the ring 27 is in engagement with a spring-pressed lever 124 that is pivotally mounted in the shutter frame. A cable release 125 of the usual form is provided for rocking the lever 124 against the pressure of its spring 126.

Starting with the shutter mechanism in spent position and the mirror up, bulb or time exposures can be made by operating a cable release at 125 which will move the stud 123 and the ring 27 in a clockwise direction against the tension of its springs 43 and 44 to open the shutter blades, the blades being maintained open for so long as the outer end of the lever 124 is depressed. Release of this pressure causes the springs 43 and 44 to return the shutter blades to closed position.

A focusing ring 128 having a stud-like handle 129 which may be conveniently located in peripherally-spaced holes of the ring, is provided for focusing the lens mounted in 19 and 23. The focusing ring has threaded engagement with an annular collar 130 on the front of the camera and helical focusing thread connection with the barrel 21 of the shutter assembly, so that when the ring 128 is turned, the lens frame will be shifted forwardly or rearwardly as may be required. In order to prevent rotation of the barrel 21 during adjusting movements of the ring 128, the barrel carries a stud 131 that extends through a hole in a bracket 132 that is secured to the camera box by screws 133, the member 132 being of yoke-like form so as to extend around the inwardly-projecting edge of the shutter assembly.

Assuming that the mirror has been set to focusing position, with the shutter open for focusing and with the shutter rings 27 and 28 under operating tension, in which condition the release of the mirror, the closing of the shutter and releasing of the tensioning means to operate the shutter would result in an instantaneous exposure, if the operator should desire instead to make a time or bulb exposure, he will release the latch 46 of the tension lever 38 and move the lever down to its lowest tensioning position. During this movement, a finger 135 on the tension lever will engage the tail piece 136 of the latch 64 to release the stud 63 of the shutter ring 27. The ring 27 will thereupon be moved by its springs 43—44, so that the shutter blades will be closed as in Fig. 9. Thereupon, the finger release 109 is pressed to move the latch 61 and release the shutter ring 28, whose movement under the tension of its springs 36 and 37 will first cause the shutter blades to open. When its stud 106 engages the latch 59, at the completion of the opening, the stud 58 is released, thus permitting the ring 27 to be further advanced and thereby close the shutter. It will be remembered that the mirror is still in its down position, shielding the film from exposure during these shutter movements. The mirror will then be raised through operation of the handle 71, leaving the camera operable by cable release at 125 for time or bulb exposures, such exposure occurring through rocking of the lever 124 and pushing against the stud 123, by a suitable release.

If it is desired that the mirror on its upward movement does not operate the trip slide 102 for releasing the operating tension on the shutter blades, as when it is desired to make a picture of a moving object at extreme speed, without the delay of the time required for the mirror to move to its uppermost position, I provide means for disengaging the crank arm 104 from the bent end 103 of the slide 102 (Fig. 1). This disengaging means comprises a lever 137 pivoted to the mirror chamber wall at 138 and carrying a stud 139 at its outer end, which is movable in a vertical slot formed in the front wall of the camera. The inner end of the lever 137 is beveled at 140, so that when said beveled end is swung upwardly, it will pass upwardly behind the head or button 141 on the rear end of the shaft 105 and spring the yieldable arm 142 of the plate 102a forwardly, carrying with it the crank 104 clear of the ledge 103, and so that when the mirror in its upward movement raises the slide 102, the shaft 105 and the latch 61 (Fig. 6) will not be operated to release the shutter.

The operating of the lever handle 71 to release the mirror will cause closing of the shutter and release the mirror for raising movement, but, as just explained, the operating tension on the shutter will not be released. A quick exposure can then be made simply by operating the button 109 with the finger or a cable release, which will trip the latch 61, allowing the rings 28 and 27 to move through their shutter-operating cycles.

While I have herein shown a 4-blade shutter, it will be understood that the shutter can comprise five blades, or any other suitable number.

I claim as my invention:

1. A reflex camera having a mirror pivoted at one edge for movement to and from a focusing position between the lens and the holder for a sensitized element, a mirror chamber having a wall of arcuate form between the lens and the mirror and having an opening therethrough in axial alignment with the lens, the wall being curved coaxially of the mirror pivot, a sealing plate connected to the rear side of the mirror and curved coaxially of the mirror pivot, in position to move on said wall and across said opening during movements of the mirror to and from focusing position, and means rendered operative through movement of the mirror, for swinging the sealing plate away from said opening at the completion of movement by the mirror from its focusing position.

2. A reflex camera having a mirror pivoted at one edge for movement to and from a focusing position between the lens and the holder for a sensitized element, a partition plate of arcuate form, between the lens and the mirror and having an opening therethrough in axial alignment with the lens, the plate being curved coaxially of the mirror pivot, a sealing plate pivotally connected to the mirror and curved coaxially of the mirror pivot, in position to move on said wall and across said opening during movements of the mirror, and means controlled by movement of the mirror, which is operable at the completion of movement by the mirror from its focusing position to swing the sealing plate away from said opening, and operable to return the sealing plate to sealing position at the commencement of movement by the mirror to focusing position.

3. A reflex camera having a mirror, means for moving said mirror to and from focusing position and a weighted lever actuated by movement of the mirror from focusing position to produce a thrust in direction to oppose the thrust exerted by the mirror on the camera structure at the completion of the last-named movement.

4. A reflex camera having a mirror, means for moving said mirror to and from focusing position, and a weight element controlled by said means and caused to move in a direction opposite to the mirror when the mirror is moving from focusing position, to produce a force that counteracts the thrust of the mirror on the camera structure.

5. A camera structure comprising a lens, a shutter, a support for a sensitized element, a reflex mirror movable to and from focusing position, tensioning mechanism for moving the shutter through an opening and closing cycle, means operable by a single member for moving the mirror to focusing position and the shutter to open position, under tension, means operable to effect movements of the mirror from focusing position and the shutter to closed position, by the forces of their respective tensions, means for retaining tensional force on the shutter and means for automatically releasing the said retaining means, to effect an exposure operation of the shutter, by its tensioning mechanism, at the completion of the last-named movements.

6. A reflex camera having a shutter, a mirror movable to and from focusing position, tensioning devices for urging the shutter toward closed position and the mirror from focusing position, an operating lever, means actuated by movement of the lever in one direction, to first set the mirror in focusing position and to open the shutter under tension, means actuated by movement of the lever in the opposite direction, for releasing the mirror and causing the shutter to be closed under tension, and a tension device actuated by the lever for effecting an opening and closing cycle of movement by the shutter.

7. A reflex camera having a mirror, means for moving the mirror to focusing position, a spring normally urging the mirror from focusing position to a fixed seat on the camera, a movable weight element, a stop element for the weight, and a device connecting the weight element and the mirror in such manner that when the mirror moves in one direction against the stop element, the weight element will be moved in the opposite direction, to produce a counteracting thrust on the camera structure when the mirror comes to rest after movement thereof by its spring to non-focusing position.

8. A reflex camera having a mirror, means for moving the mirror to focusing position, a spring normally urging the mirror from focusing position to a fixed seat on the camera, a movable weight element, a stop element for the weight, a spring normally urging the weight element in a direction opposite to that in which the mirror moves to non-focusing position, and a device connecting the weight element and the mirror in such manner that when the mirror moves in one direction the weight element will be moved in the opposite direction against the stop element, to produce a counteracting thrust on the camera structure when the mirror comes to rest at the end of its movement by its spring to non-focusing position.

9. A reflex camera having a mirror movable to and from a focusing position between the lens and the holder for a sensitized element, a stationary partition plate between the lens and the mirror, and having an opening therethrough in axial alignment with the lens, a sealing plate having pivotal connection with the mirror and carried thereby, a spring normally tensioned to yieldably hold the plate in folded position against the rear side of the mirror, and means operable during movement of the mirror to focusing position for rocking the plate against the tension of the spring, against the partition plate to seal said opening, and for releasing the plate for movement from its sealing to its folded position, at about the completion of movement of the mirror from focusing position.

10. A reflex camera having a mirror movable to and from a focusing position between the lens and the holder for a sensitized element, a stationary partition plate between the lens and the mirror, and having an opening therethrough in axial alignment with the lens, a sealing plate having pivotal connection with the mirror and carried thereby, a spring normally tensioned to yieldably hold the plate in folded position against the rear side of the mirror, and means operable during movement of the mirror to focusing position for rocking the plate against the tension of the spring, against the partition plate to seal said opening, and for releasing the plate for movement from its sealing to its folded position, at about the completion of movement of the mirror from focusing position, the said means comprising a guide arm on the plate and a stationary curved guide plate engaged by the arm.

11. Camera apparatus comprising a mirror movable to and from focusing position, a shutter having blades of the iris type, blade-operating members mounted for relative oscillatory movements for opening and closing the blades, springs for tensioning said members, means for moving the mirror to focusing position, under tension, means automatically operable during said mirror movement, to place the blade-operating members under operating tension, and to shift one of the members to a position at which the blades are open, means for releasably latching said operating members under tension, a latch for releasably holding the mirror under tension, and means operative through movement of the mirror from focusing position, upon release of its latch, for releasing the said blade-operating members, in succession, for movement by their springs, whereby the shutter blades are first opened and then closed.

12. Camera apparatus comprising a mirror movable to and from focusing position, a shutter having blades of the iris type, blade-operating members mounted for relative oscillatory movements for opening and closing the blades, springs for tensioning said members, means for moving the mirror to focusing position, under tension, means automatically operable during said mirror movement, to place the blade-operating members under operating tension, and to shift one of the members to a position at which the blades are open, a latch releasably holding the mirror at its focusing position, a latch releasably holding said one member at its last-named position under tension, a latch for releasably holding the other member under tension, means for tripping the mirror latch and the latch of said one member while the blade-operating members are maintained under tension, a latch limiting movement of said one member to a point at which the shutter is in closed position and the said member is still under tension, and means operated by the mirror at approximately the end of its travel from focusing position, for releasing the said blade-operating members in succession, for movement by their springs, whereby the shutter blades are first opened and then closed.

THOMAS McG. AIKEN.